United States Patent
Yajima et al.

(10) Patent No.: US 6,226,306 B1
(45) Date of Patent: May 1, 2001

(54) DATA TRANSMISSION RATE CONTROL USING A TRANSMISSION CONTROL SCHEME SUITABLE FOR SUBBANDS FORMING AN ENTIRE BAND

(75) Inventors: Yoshiyuki Yajima; Makoto Tanaka, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 08/874,281

(22) Filed: Jun. 13, 1997

(30) Foreign Application Priority Data

Jun. 20, 1996 (JP) .................................................. 8-159491

(51) Int. Cl.$^7$ .................................................. H04L 12/56
(52) U.S. Cl. .................................................. 370/538
(58) Field of Search .................................................. 370/237, 462, 370/477, 468, 395, 538; 455/103; 375/109, 110

(56) References Cited

U.S. PATENT DOCUMENTS

| | | | |
|---|---|---|---|
| 3,674,939 | * 7/1972 | Brooks | 370/206 |
| 4,071,707 | * 1/1978 | Graf et al. | 179/15 |
| 4,757,495 | * 7/1988 | Decker et al. | 370/477 |
| 5,420,861 | * 5/1995 | De La Bourdonnaye | 370/462 |
| 5,742,586 | * 4/1998 | Murakami et al. | 370/237 |
| 6,041,040 | * 3/2000 | Beshai et al. | 370/468 |

FOREIGN PATENT DOCUMENTS

| | | |
|---|---|---|
| 0677941 | 10/1995 | (EP) . |
| 0693840 | 1/1996 | (EP) . |
| 2258581 | 2/1993 | (GB) . |

* cited by examiner

Primary Examiner—Salvatore Cangialosi
(74) Attorney, Agent, or Firm—Venable; Robert J. Frank; Jeffrey W. Gluck (57) ABSTRACT

A data transmission rate control method in which a transmission control scheme used for data transmission over each channel is switched depending on a subband to which a proper transmission rate of the channel belongs, the subband being prepared by dividing an entire band by one or more boundaries. This makes it possible to solve a problem in conventional systems of variations in accuracy due to the bandwidth, and an increase in the circuit scale, when the a cell rate to be controlled ranges over wide bandwidth.

8 Claims, 7 Drawing Sheets

DATA TRANSMISSION RATE CONTROL USING A TRANSMISSION CONTROL SCHEME SUITABLE FOR SUBBANDS FORMING AN ENTIRE BAND

BACKGROUND OF THE INVENTION

1. Field of the Invention

The present invention relates to a data transmission rate control method and system applicable to cell transfer switches such as ATM (Asynchronous Transfer Mode) switches, ATM routers, ATM bridges, or other telecommunications equipment.

2. Description of the Background Art

Today, the following three methods are predominantly used for controlling the transmission rate of a fixed length of data (referred to as a cell below): the two minimum intercell gap, or cell interval, control schemes or methods, including a cell period based scheme and a clock period based scheme; and the sliding window control scheme. To distinguish the two minimum cell interval control schemes from each other hereinbelow, the cell period based minimum cell interval control scheme is referred to as a cell-based minimum intercell gap control scheme, while the clock period based minimum cell interval control scheme is referred to as a clock-based minimum cell interval control scheme.

First, the cell-based minimum cell interval control scheme will be described. The scheme controls the gap or time interval between the preceding transmitted cell and the current transmitted cell on the basis of the cell transmission period. Accordingly, if a target transmission rate is 50% of the peak rate, for example, the transmission is carried out at two cell intervals.

Second, the clock-based minimum cell interval control scheme is basically the same as the cell-based minimum cell interval control scheme. The clock-based one, however, uses the clock period instead of the cell period to time the interval between two consecutive transmitted cells. This enables a more accurate peak rate control.

On the other hand, the sliding window control scheme makes a decision whether or not a cell can be transferred at each cell timing by shifting a time window with a predetermined length at every cell interval. The transmission of the current cell is allowed if the number of cells in the time window which have already been transmitted is less than a permitted number.

Figure 7:
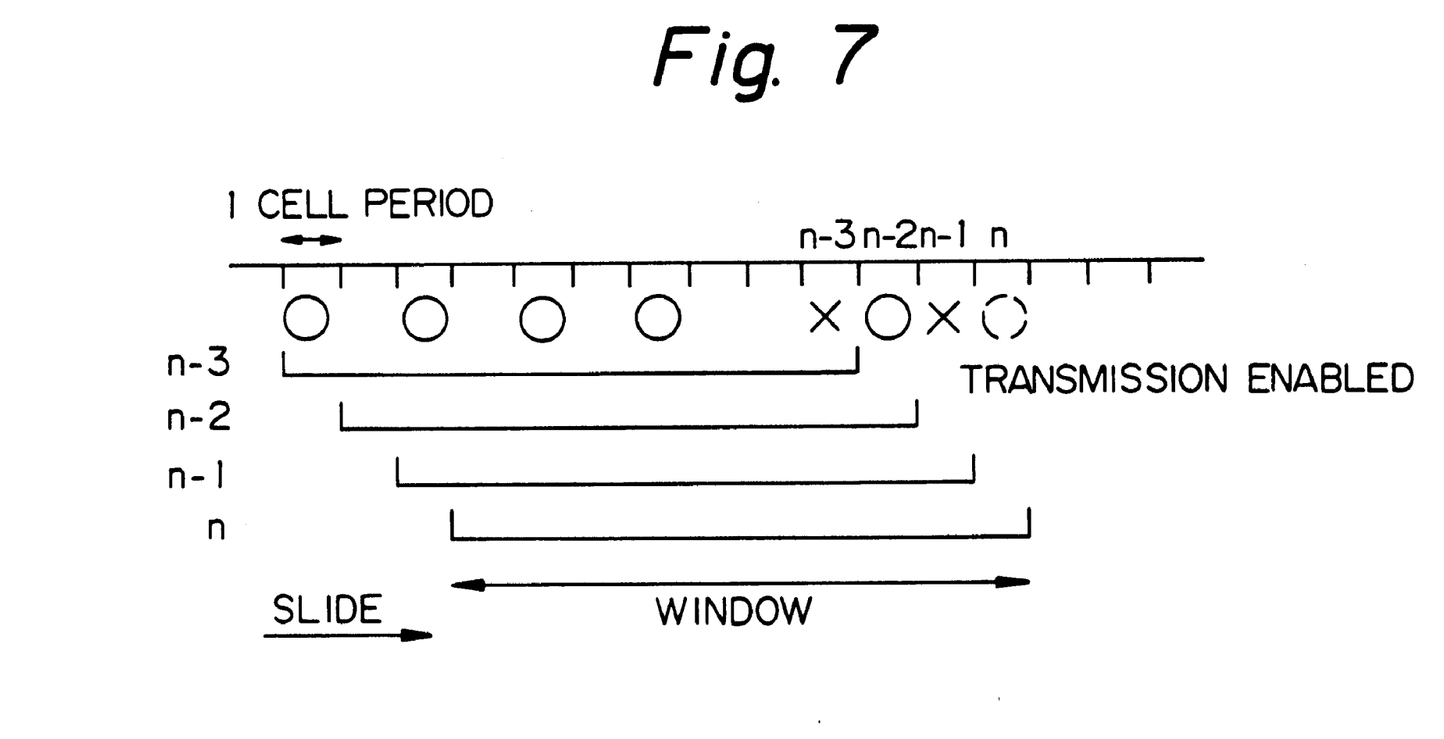
FIG. 7 is a schematic diagram useful for understanding a concept of the sliding window control scheme.

More specifically, reference is made to FIG. 7, which illustrates the sliding window control scheme for controlling the transmission rate at 40% of the peak rate. In the figure, if a cell is transferred at a time period #n-3, the total number of the cells in the time window becomes five which exceeds the permitted number, four. Thus, the transmission of the cell is inhibited at this time period, as depicted with a mark "X". At the next time period #n-2, the transmission of the cell is allowed, as shown with a circle because the total number of the cells in the time window will be within the permitted number, four, even if it is transmitted, because the total number has been reduced by one by sliding the time window by one cell period. Similar processing is iterated at time periods #n-1, #n, and so on.

The foregoing control schemes, however, present the following problems. First, since the cell-based minimum cell interval control scheme controls the transmission of cells based on the cell period, it has a problem in that gaps or intervals between controllable values become rough at high rates (particularly, in a range close to the peak rate). For example, the controllable value is 100% at every cell interval, 50% at two cell intervals, 33% at three cell intervals, 25% at four cell intervals, 20% at five cell intervals, and so on. Thus, the controllable values have greater gaps as the transmission rate increases.

In addition, since the cell-based minimum cell interval control scheme checks each channel in time division mode, its accuracy degrades with the increasing number of channels. For example, assume that the number of channels is 1024, that the check is carried out one channel per clock period, and that one cell period is 53 clock periods; it takes about 20 cell periods to complete all of the cells, which may cause time errors in the transmission control.

Second, although the clock-based minimum cell interval control scheme can solve the controllable gap problem of the cell-based minimum cell interval control scheme, it presents a new problem in that increase in circuit scale is unavoidable as compared with the cell-based minimum cell interval control scheme. This is because the number of bits needed for controlling the transmission enable time increases in the clock-based minimum cell interval control scheme: an increase of six bits is required when one byte is handled during one clock period. For example, when the bandwidth is limited to 1% of that of the peak rate, the transmission must be carried out once per 100 cells. To achieve this, although it is enough for the cell-based minimum cell interval control scheme to have six bits, the clock-based minimum cell interval control scheme requires twice that number, 12 bits, which inevitably doubles the number of bits of its circuit components such as a counter, adder and comparator.

Finally, the sliding window control scheme has a problem in that the width of the shift register increases as the minimum value of the controllable value decreases. For example, although the minimum required window width is only 10 when the minimum value is 10%, it increases, for example, to 100 for 1%, and 10000 for 0.01%. Since the sliding window control scheme requires a shift register with register stages corresponding to the width of the time window, a shift register with an increasing number of bits must be prepared as the minimum value reduces.

The number of bits required per shift register stage depends on a channel identifier and is 24 bits for the VPI/VCI of an ATM cell. Therefore, when the transmission rate of a particular channel is 0.01% of the peak rate, flip-flops of 320 kilobits are required, which presents a problem in that it is difficult to implement such a system in hardware.

Moreover, although it is possible for the cell-based minimum cell interval control scheme or clock-based minimum cell interval control scheme to perform transmission always at a fixed rate independently of the bandwidth because the transmission interval is checked between the previous cell and the current cell, the sliding window control scheme, which determines transmission according to the number of cells in the time window, and hence requires a wider time window as the bandwidth of the channel decreases, has a problem in that the fluctuations of the cells in the time window increase with decreasing bandwidth.

SUMMARY OF THE INVENTION

It is therefore an object of the present invention to provide a data transmission rate control method and system which can control transmission rates in such a manner that data for multiplex transmission are transferred over channels at the proper transmission rates of the respective channels.

According to a first aspect of the present invention, there is provided a data transmission rate control method comprising the steps of controlling data fed to multiplex transmission channels such that data on each of the channels is transmitted at a transmission rate proper to the channel; dividing an entire band by at least one boundary to prepare a subband, to which the transmission rate proper to the channel belongs; and switching a transmission control scheme used for transmitting data over each of the channels in accordance with the subband.

Here, the number of the at least one boundary may be one, and the transmission control scheme used for transmitting data may apply a clock period based scheme to a subband with a wider bandwidth than the boundary and a cell period based scheme to a subband with a narrower bandwidth than the boundary.

The number of the at least one boundary may be one, and the transmission control scheme used for transmitting data may apply a sliding window scheme to a subband with a wider bandwidth than the boundary and a cell period based scheme to a subband with a narrower bandwidth than the boundary.

According to a second aspect of the present invention, there is provided a data transmission rate control system that controls data fed to multiplex transmission channels such that data on each of the channels is transmitted at a transmission rate proper to the channel, the system comprising: band identifying means for making a decision of a subband to which the transmission rate proper to each channel belongs and for attaching to each channel an identifier corresponding to a result of the decision, the subband being prepared by dividing an entire band by at least one boundary; a plurality of controllers corresponding to each of the subbands for controlling the transmission; and means for selecting one of the controllers suitable for the channel to which the identifier is attached.

Here, the number of the at least one boundary may be one, and the controllers may comprise a first control circuit for applying a clock period based scheme to a subband with a wider bandwidth than the boundary and a second control circuit for applying a cell period based scheme to a subband with a narrower bandwidth than the boundary.

The number of the at least one boundary may be one, and the controllers may comprise a first control corciut for applying a sliding window scheme to a subband with a wider bandwidth than the boundary and a second control circuit for applying a cell period based scheme to a subband with a narrower bandwidth than the boundary.

According to the data transmission rate control method and system in accordance with the present invention, the entire band is divided into a plurality of subbands so that a transmission control scheme suitable for each subband is used. Thus, the data can be transmitted over each channel by a control scheme appropriate for the transmission bandwidth of that channel. This makes it possible for each channel to control data transmission in a highly accurate fashion, even if the channels range over a wide transmission band.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

The invention will now be described with reference to the accompanying drawings.

EMBODIMENT 1

The first embodiment of the data transmission rate control system in accordance with the present invention, which will now be described, is applied to a cell rate control system in a cell transfer type of telecommunications system. This embodiment is adapted to divide the controlled band into an upper band and a lower band so that the control scheme is changed in accordance with the band in such a manner that the transmission timing of input cells belonging to the upper band is controlled by the clock-based minimum cell interval control scheme, while that of input cells belonging to the lower band is controlled by the cell-based minimum cell interval control scheme.

Figure 1:
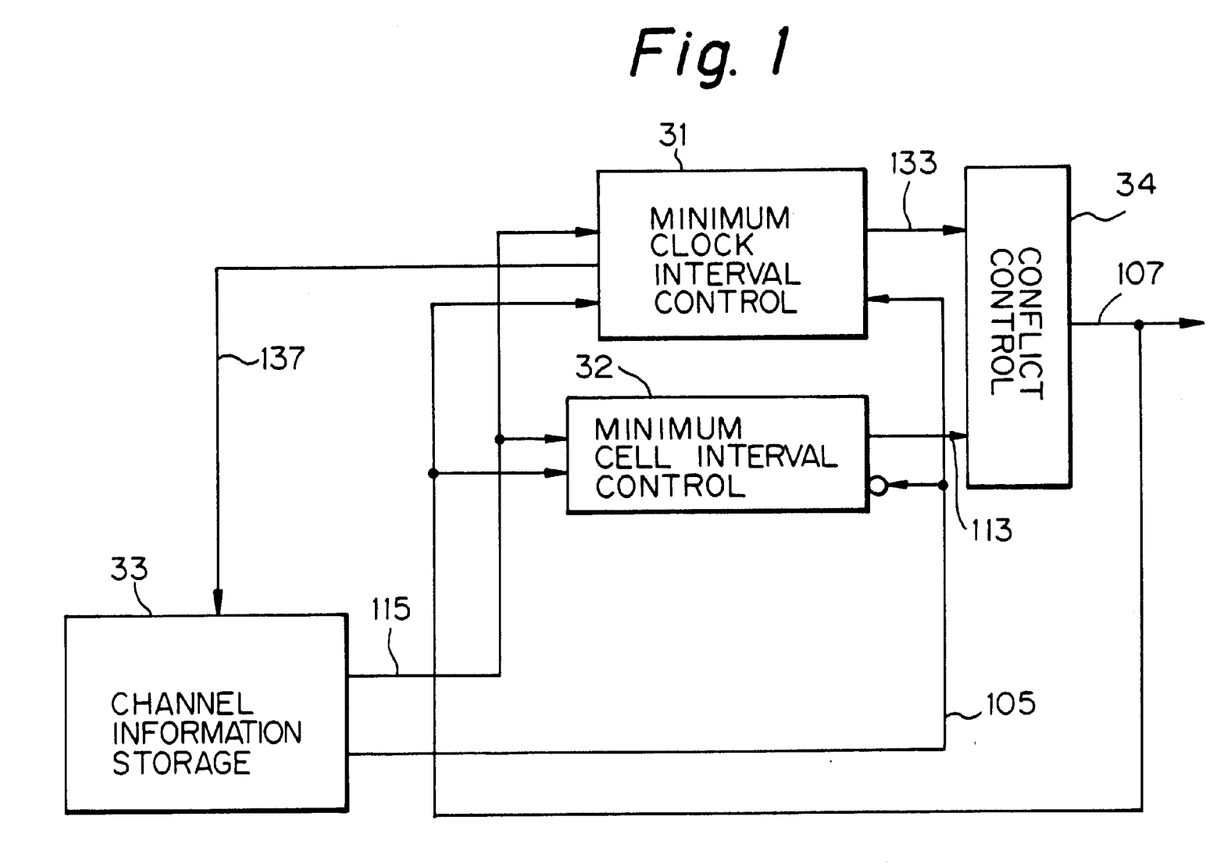
FIG. 1 is a schematic block diagram showing the entire configuration of a first embodiment of a data transmission rate control system in accordance with the present invention.

With reference to FIG. 1, which shows in a block diagram the cell rate control system associated with the first embodiment, the cell rate control system generally includes four functional blocks: a clock-based minimum cell interval control 31; a cell-based minimum cell interval control 32; a channel information memory 33; and a conflict control 34.

Figure 2:
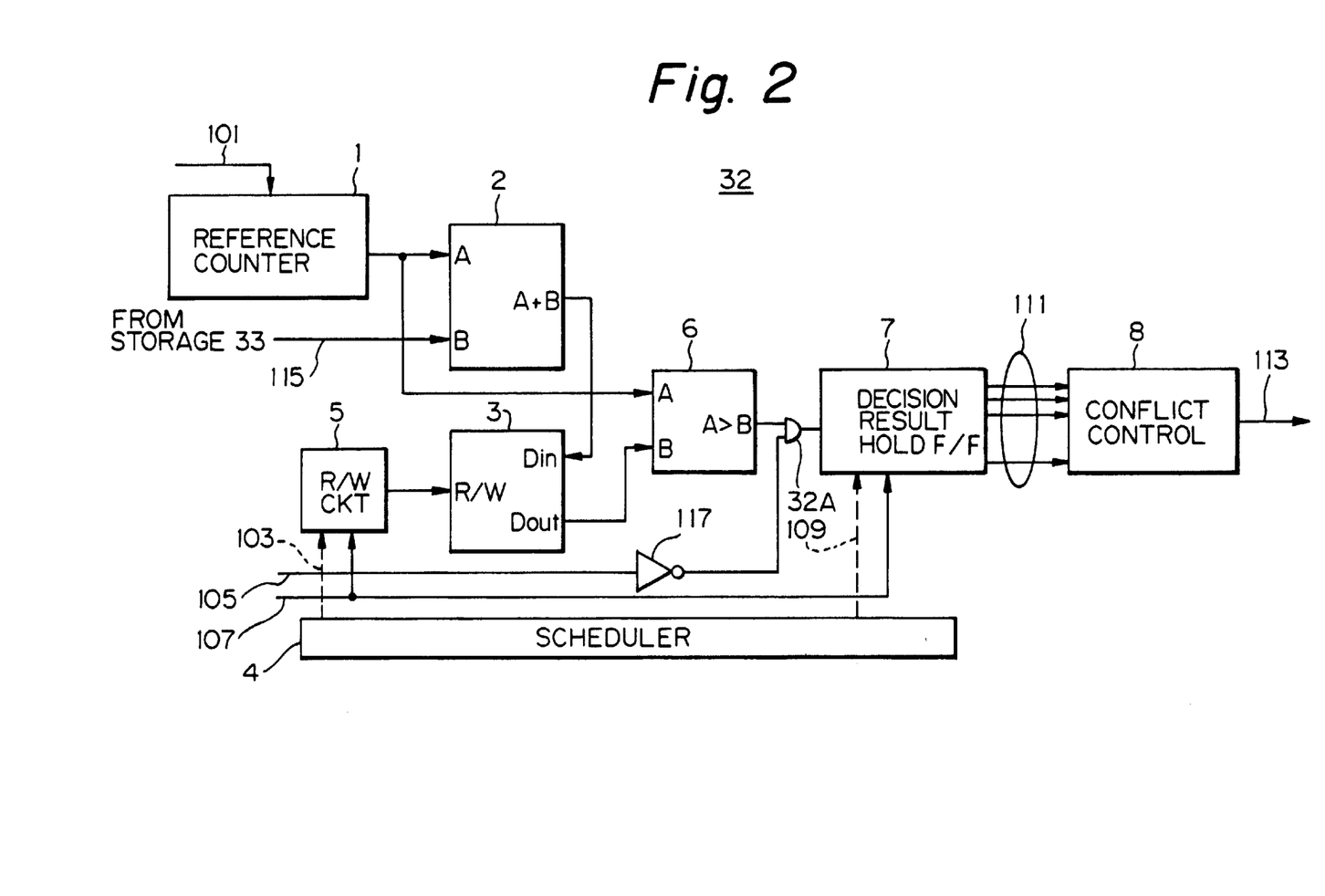
FIG. 2 is a schematic block diagram showing a cell-based minimum cell interval control included in the first embodiment.

The cell-based minimum cell interval control 32 is adapted for controlling the cell rate by means of the cell-based minimum cell interval control scheme. FIG. 2 shows the cell-based minimum cell interval control 32. It includes a reference counter 1 which operates as an infinite counter for incrementing in each period according to cell period signal 101. When transmitting a cell, an adder 2 adds to a count A in the reference counter 1 a peak rate value 115 associated with a channel over which the cell is transferred. The result A+B from the addition is a cell transmission enable time for the next transmission, and is written in a particular storage location in a memory 3, which is assigned to each channel. The location is addressed by a R/W (read/write) circuit 5 under the control of a scheduler 4. The scheduler 4 manages the assignment of times for checking channels in a time division mode. This is done because a check circuit provided for each channel would increase the circuit scale.

The cell transmission enable time thus written into a particular location of the memory 3 is read out sequentially therefrom by the R/W circuit 5, which receives the read command 103 from the scheduler 4, and is in turn input to a comparator 6. The comparator 6 makes a decision on whether or not the transmission is to be enabled by comparing a count (present time) A contained in the reference counter 1 with the cell transmission enable time B read out from the memory 3.

When that count value A exceeds the cell transmission enable time B, a transmission enable signal is supplied to a decision result holding flip-flop 7 through an AND gate 32A, when enabled. The AND gate 32A is adapted to AND the transmission enable signal A>B with an inverted signal of a control scheme selection bit 105 to select the cell-based minimum cell interval control scheme when the selection bit 105 is at its low level. There are M decision result hold flip-flops 7, where M is the number of the channels, and one of them is selected to hold the transmission enable signal 107 in response to a signal 109 fed from the scheduler 4.

The outputs 111 of the decision result hold flip-flops 7 are supplied to a conflict control 8 so that channels corresponding to outputs with the "H" level under conflict are controlled by the conflict control 8. The information about the channel that wins the conflict is output in the form of channel information 113 representing the enabled channel. The decision result hold flip-flop 7 associated with the enabled channel is reset, and the output A+B of the adder 2 is written into the memory 3 by the R/W circuit 5 as the next transmission enable time.

Thus, the cell-based minimum cell interval control 32 controls the transmission timing of the cells on the basis of the peak rate value 115, fed from the channel information storage 33, and the transmission enable channel information 107 that wins the conflict and is fed from the conflict control 34. The information 113 about the channel that wins the conflict in the cell-based minimum cell interval control 32 is supplied to the conflict control 34 as the lower band transmission enable channel information to undergo the final conflict control.

Figure 3:
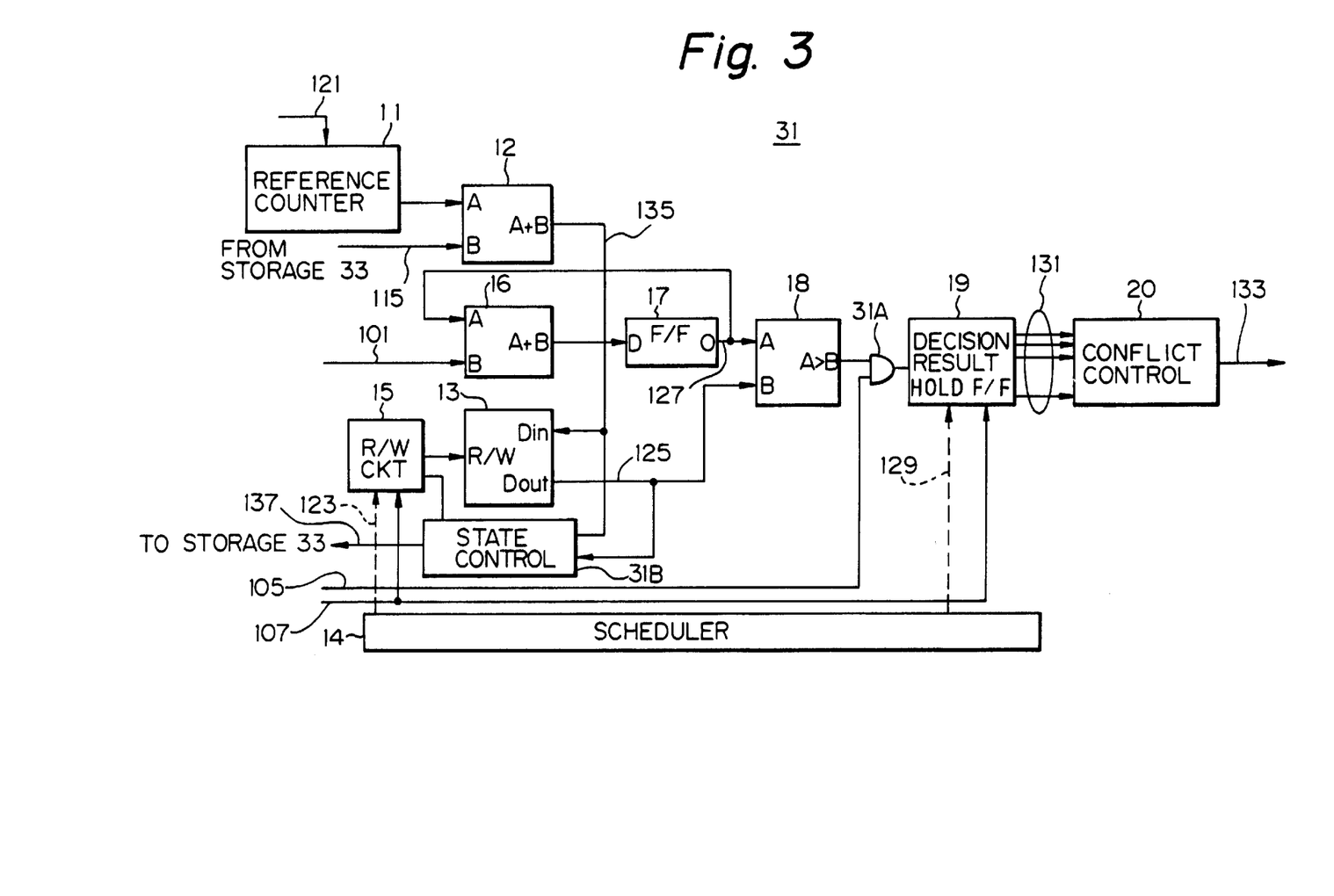
FIG. 3 is a schematic block diagram showing a clock-based minimum cell interval control included in the first embodiment.

FIG. 3 shows in a block diagram the clock-based minimum cell interval control 31. In the figure, a reference counter 11 is also an infinite counter for counting each clock pulse of a clock signal 121. The output A of the reference counter 11 is added by an adder 12, when a cell is transmitted, to the peak rate value 115 associated with the channel over which that cell is transmitted. The result A+B of the addition is written into a particular storage location of a memory 13 as data representing a next transmission enable time.

A scheduler 14 is adapted to manage the assignment of times for checking channels. A R/W (read/write) circuit 15, receiving a read command 123 from the scheduler 14, causes the memory 13 to develop the next transmission enable time data 125 of the channel to be checked. Although the cell-based minimum cell interval control scheme compares the next transmission enable time with a count held in the reference counter at the check time, the clock-based minimum cell interval control scheme corrects the time as follows because the count of the reference counter 11 increments during the time period from the check to the actual transmission of the cell.

Specifically, the next transmission enable time 125 is compared by a comparator 18 with a transmission estimate time 127 which is generated by an adder 16 and a hold flip-flop 17 that is incremented by one at each cell period signal 101. In the illustrative embodiment, each cell period of the signal 101 consists of 53 clock periods of the signal 121, for example, where one-byte data is forwarded by one clock pulse.

If the reference count 127 exceeds the next transmission enable time 125 in the comparator 18, then a transmission enable signal A>B is supplied to a decision result hold flip-flop 19 via an AND gate 31A, when enabled, to be held therein. The AND gate 31A is adapted to AND the transmission enable signal A>B with a control scheme selection bit 105 to select the clock-based minimum cell interval control scheme when the selection bit 105 is at its high level.

There are M decision result hold flip-flops 19, and one of them is selected to hold the transmission enable signal A>B in response to a signal 129 fed from the scheduler 14. The channels in connection with the H level outputs 131 of the decision result hold flip-flops 19 are conflict-controlled by a conflict circuit 20, and the decision result hold flip-flop 19 of the channel that wins the conflict is reset and hence its channel information becomes transmission enabled. In addition, the output 135 of the adder 12 is written into the memory 13 as the next transmission enable time data uner the control of the R/W circuit 15.

Thus, the clock-based minimum cell interval control 31 controls the transmission timing on the basis of the peak rate value 115 fed from the channel information storage 33, FIG. 1, and the transmission enable channel information 107 which passes the conflict and is fed from the conflict control 34. The information 133 about the channel that wins the conflict is supplied to the conflict control 34 as the upper band transmission enable channel information to undergo the final conflict processing.

The clock-based minimum cell interval control 31 has a functional circuit 31B which is adapted to monitor the control state of the respective channels subject to the control, and to write into the channel information storage 33 a transmission enable bit 137 indicating for each channel whether or not the foregoing decision processing is needed when the next cell is input. Details of the state control 31B which outputs the transmission enable bit 123 will be described later.

The channel information storage 33 includes a table referred to at first when a cell is input so that parameters of each channel are read out from the channel identifier of the cell header and written into the channel information storage 33. For example, band information of the channel specified by the channel identifier is extracted to provide information about whether the input cell is to be processed in the clock-based minimum cell interval control 31 or in the cell-based minimum cell interval control 32. The information is provided to the clock-based minimum cell interval control 31 and the cell-based minimum cell interval control 32 in the form of the control scheme selection bit 105.

The control scheme selection bit 105 is input to the clock-based minimum cell interval control 31 without change, and to the cell-based minimum cell interval control 32 with its polarity inverted by the inverter 117, which therefore enables only one of the two controls 31 and 32 to be selected. The channel information storage 33 further holds the transmission enable bit 137 of each channel indicating whether or not the channel is in the transmission enable state at the cell input time.

The conflict control 34 is adapted for carrying out the conflict control between the channel selected by the clock-based minimum cell interval control 31 and that selected by the cell-based minimum cell interval control 32 to decide the final channel to be transmission enabled. The data representing the final channel is developed from the output 107 of conflict control 34.

In operation, when a new cell arrives the channel to which the incoming cell corresponds is identified from the channel identifier included in its cell header. Then, the peak rate value associated with the channel, which is stored in the channel information storage 33, is supplied to the clock-based minimum cell interval control 31 and to the cell-based minimum cell interval control 32. In addition, the channel information storage 33 provides the clock-based minima cell interval control 31 and the cell-based minimum cell interval control 32 with the control scheme selection bit 105 indicating the band to which the channel of the input cell belongs: the upper band or the lower band.

In the illustrative embodiment, the control scheme selection bit 105 is set to binary "1" if the band of the cell is greater than a threshold values and to "0" if smaller than that value. In other words, the clock-based minimum cell interval control scheme is selected when the control scheme selection bit 105 is "1", and the cell-based minimum cell interval control scheme is selected when it is "0".

Next, the operation of the clock-bas ed minimum cell interval control 31 and the cell-based minimum cell interval control 32 will be described, which check for each channel whether or not transmission is possible in the time division more. The control scheme selection bit 105 is input to the selection gate 31A of the clock-based minimum cell interval control 31 without change, and to the selection gate 32A of the cell-based minimum cell interval control 32 with its polarity inverted so that one of them is "1" and the other is "0". In other words, the selection gates 31A and 32A each consisting of an AND gate, operate in such a manner that one of them enables the check result of the previous stage by the bit "1", and the other of them disables that of the previous stage by the bit "0".

Thus, the present embodiment controls only a limited number of channels out of the entirety of channels by the clock-based minimum cell interval control scheme, that is, only channels belonging to the upper band. For example, assuming that the minimum value of the bandwidth that can be controlled by the clock-based minimum cell interval control scheme is 10% for each channel by setting the threshold value at 10% of the peak value, the total sum reaches 100% when 1o channels with the 10% bandwidth are simultaneously controlled. Thus, the number of channels to be controlled by the clock-based minimum cell interval control scheme becomes 10, and hence the clock-based minimum cell interval control scheme is applied to only 10 channels.

Figure 4:
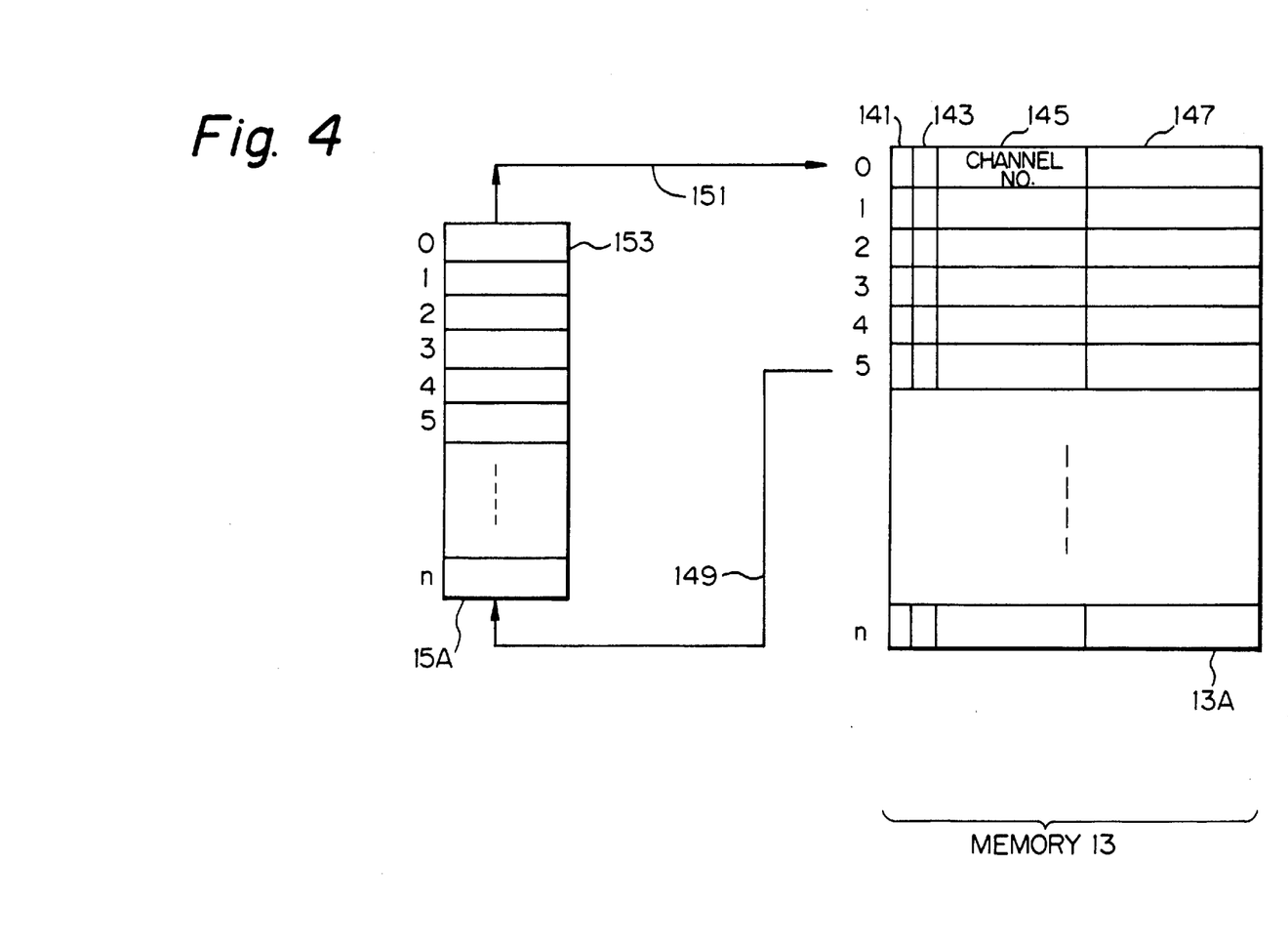
FIG. 4 is a schematic diagram useful for understanding the outline of the function of managing a simultaneous channel idle table FIFO memory by a state manager.

Let us assume that the threshold is set up so that a channel to be controlled now is associated with the clock-based minimum cell interval control 31. In this case, the information about the channels limited as described above is written into a management table 13A established in the memory 13 together with the next transmission enable time and is held there. The management table 13A stores four items as shown in FIG. 4: the control state 141 of each cell; information 143 about whether or not the cell is present in the buffer, not shown; a channel number 145; and the next transmission enable time 147. Among these items, the control state 141 and the present/absent information 143 of a cell in the buffer are also used for generating the transmission enable bit 137.

Writing into the memory 13 is carried out using an idle table address FIFO memory 15A in the R/W circuit 15. The FIFO memory 15A has n storage locations, and is adapted to store the addresses 1, 2, . . . , n addressing the storage locations of the memory 13 in the first-in-first-out (FIFO) order towards its top address location #0 at the initial state of the management table 13A of the memory 13, in which no information has been stored yet, where n is a natural number representing the number of channels controllable simultaneously. How the address 153 kept in the FIFO memory 15A designates a location in the table 13A which is newly brought into control is indicated by a line 151 in FIG. 4. Thus, one of the addresses 1, 2, 3, . . . , n is designated in order every time an upper band cell is input. A table address removed from the simultaneous control by the completion of the transmission is written into the final position of the idle table address FIFO memory 15A, thereby preparing for the next write, as represented by the line 149.

Referring to FIG. 4, which operatively illustrates the relationships between the management table 13A and the vacant table address FIFO memory 15A, the state control 31B always controls the transmission timings of the channels by dynamically changing the channels subjected to simultaneous control using the management table 13A and idle table address FIFO memory 15A.

The clock-based minimum cell interval control 31 operates in the manner described below in respective cases using the state control 31B. First, when the check result by the comparator 18 is disabled, and this information has not yet been set in the decision result hold flip-flops 19, the state control 31B sets the control state bit 141 of the management table 13A to its under-control state.

In contrast, when the cell has already been transferred, the state control 31B sets the transmission enable bit at binary "0" and stores it in the channel information storage 33. As described above, the transmission enable bit 137 represents whether or not the cell can be transmitted without undergoing the decision of the clock-based minimum cell interval control 31 when the cell is input. In this case also, the state control 31B sets the control state bit 141 in the management table 13A of the memory 13 to its under-control state.

With regard to the channels for which it is found that their next transmission enable times 147 have already elapsed as a result of the comparison by the comparator 18, the state control 31B makes a decision whether or not there is a cell in the buffer, and if a cell is present therein, it sets the control state bit 141 to its under-control state. If no cell is present in the buffer, the state control 31B sets the transmission enable bit 137, thereby entering the control completion state which means that the channel is removed from the channels to be controlled simultaneously.

In the case where a new cell is input, the state control 31B checks whether or not the transmission enable bit 137 in the channel information storage 33 is binary "0", and if it is "0", then the state control 31B stores the cell in the buffer and enters its under-control state. In contrast, if the transmission enable bit is binary "1", the state control 31B unconditionally issues a transmission command 137 without making any new decision because the transmission timing interval has already elapsed. However, if the transmission is disabled because of losing the conflict, the state control 31B sets the transmission enable bit 137 at "0", thereby entering its under-control state.

When the control state bit 141 indicates its under-control state, the state control 31B reads out the address indicating an idle location of the table 13A from the idle table address FIFO memory 15A, and then sets in the table the control bit 141 to binary "1", as well as the present/absent bit 143 of the cell stored in the buffer at present, and writes the corresponding channel number 145 and the next transmission enable time 147.

On the other hand, when the control state bit 141 indicates the completion of the control, the control bit 141 in the table 13A of the memory 13 is set to "0", and the address of an entity location in the table 13A is written into the final position of the idle table address FIFO memory 15A.

In the case where the number of the channels exceeds the number of controllable channels, that is, there is no idle table address FIFO memory 15A, the input cell is relinquished before being stored in the buffer as uncontrollable.

In the above, it was described how the clock-based minimum cell interval control 31 operates. The cell-based minimum cell interval control 32 carries out the processing in a manner similar to the processing described above. The conflict control 34 the performs the conflict control between the upper band transmission enable channel information 133 output from the clock-based minimum cell interval control 31 and the lower band transmission enable channel information 113 output from the cell-based minimum cell interval control 32. Conflict control 34 selects the channel information 107 that wins the conflict at each cell period as the channel information of the cell that is actually transmitted. The conflict control 34 uses round-robin scheduling so that the probability of selection becomes even.

As described above, the first embodiment divides the band into two subbands and assigns the wider subband to the clock-based minimum cell interval control scheme and the narrower subband to the cell-based minimum cell interval control scheme. This makes it possible to solve the conventional problems as follows:

Although controlling the wider subband only by the cell-based minimum cell interval control scheme has a problem in that the accuracy degrades sharply, the cell rate control can be achieved throughout the entire band with small variations in accuracy by controlling the wider subband by the clock-based minimum cell interval control scheme and the narrower subband by the cell-based minimum cell interval control scheme.

Furthermore, since applying the cell-based minimum cell interval control scheme to the narrower subband is equivalent to applying it to channels on which the cell intervals are large, control error due to an increasing number of channels can be reduced thanks to the large intervals between the transmitted cells.

Moreover, the first embodiment assigns the clock-based minimum cell interval control scheme only to the control of the wider subband, restricts the number of channels simultaneously controlled, and comprises a means for dynamically changing the table of simultaneously controlled channels in accordance with the control state. This makes it possible to limit the number of bits of the next transmission enable time, that is, to limit the hardware scale, and to maintain control accuracy, which was one of the conventional problems.

EMBODIMENT 2

An alternative, or second, embodiment of a data transmission rate control unit in accordance with the present invention will be described referring to the drawings. In this embodiment, the data transmission rate control unit is applied to the cell rate control unit in a cell transfer communications system. In the cell rate control unit in accordance with the second embodiment, the control band is also divided into the upper and lower bands, to which different control schemes are applied. In the instant embodiment, however, the sliding window control scheme is assigned to the upper band with a wider control bandwidth, and the cell-based minimum cell interval control scheme is assigned to the lower band with a narrower bandwidth, thereby making good use of the advantages of the respective control methods.

Figure 5:
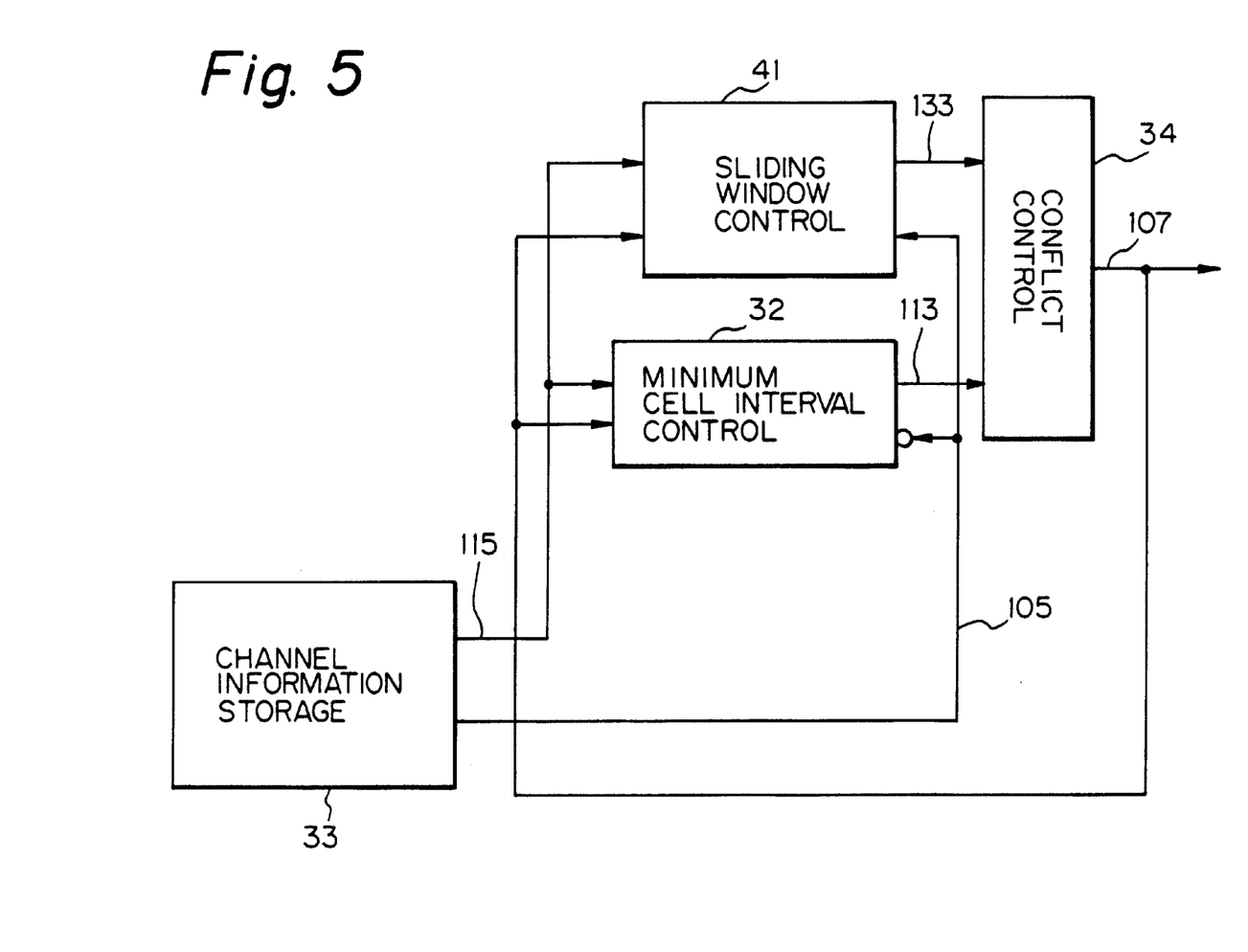
FIG. 5 is a schematic block diagram showing the entire configuration of a second embodiment of a data transmission rate control system in accordance with the present invention.

This embodiment is described with reference to FIG. 5, which shows in a block diagram the cell rate control unit relating to the second embodiment. The cell rate control unit includes four functional blocks: a sliding window control 41; the cell-based minimum cell interval control 32; the channel information storage 33; and the conflict control 34. In the figures, the like elements are designated with the same reference numerals, and a redundant description will be omitted. The inter-connections between these functional blocks may be the same as those of the first embodiment with sliding window control 41 replacing minimum cell interval control 31 of the first embodiment.

Figure 6:
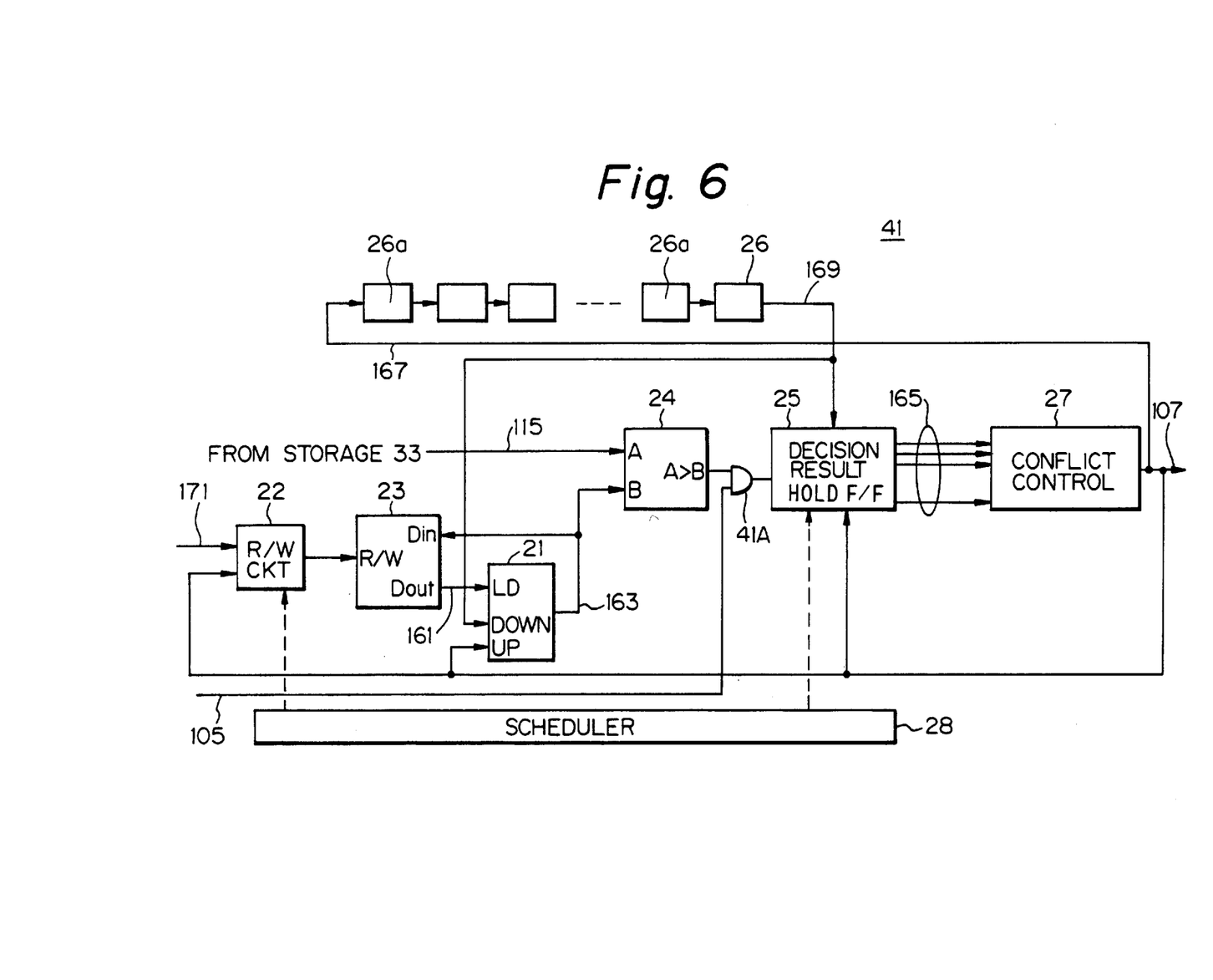
FIG. 6 is a schematic block diagram showing a sliding window control included in the second embodiment.

Referring to FIG. 6, the sliding window control 41 is adapted to control the number of cells in the time window using an intra-window cell counter 21. The intra-window cell counter 21 is an up-down counter which up-counts when a cell inside the time window is transmitted and down-counts when the cell is removed from the time window. When an incoming cell or an outgoing cell is present, that is, when checking the number of cells in the window, a R/W circuit 22, which is responsive to the channel information 171 on the incoming cell, is activated to cause data 161 representing the number of cells in the window of the corresponding channels to be read out from a memory 23. Thus, the data 161 representative of the number of cells is loaded in the intra-window cell number counter 21.

The data 163 representing the number of cells in the window and developed from the counter 21 is in turn compared with the peak rate value 115 (a permitted number of cells in the window) by a comparator 24. If the value of the data 163 does not exceed the permitted number of cells 115, then the result A>B is supplied to a decision result hold flip-flop 25 through an AND gate 41A, when enabled, to be held for each channel as transmission enable information. The AND gate 41A is adapted to AND the output A>B of the comparator 24 with the control scheme selection bit 105, and in turn passes the output A>B of the comparator 24 only when the control scheme selection bit 105 is at its high level. This means that the sliding window control 41 is inhibited when the control scheme selection bit 105 is at its low level. Then, a conflict control 27 carries out conflict control on the outputs 165 from the flip-flops 25 among the channels whose decision result hold flip-flops 25 are set, and the cell of the channel which wins the conflict will be handled as the output cell. When the cell is transmitted, the decision result hold flip-flop 25 of that channel is reset. Subsequently, the number of cells in the window is incremented by one, and if the transmission decision is positive at that instant, the corresponding decision result hold flip-flop 25 is set again.

The sliding window control 41 is provided with a shift register 26 having register stages 26a, of which the number corresponds to the width of the window and which are adapted to shift at every one cell interval independently of the check of the input and output of the cells. In this case, the channel identifier of the output cell is input to the shift register 26 at that cell timing. If no output cell is present, information 167, indicating that, is input. The information obtained from the output 169 of the shift register 26 is the channel identifier of the cell which was transmitted and removed from the time window in the past. The channel removed from the time window results in a space for one cell, and hence if no cell is present in the corresponding channel and a cell is present in the buffer at that cell timing, then the decision result hold flip-flop 25 is set. The control 41 also includes a scheduler 28 which checks the input cell and output cells, and generates timings for shifting the window or other required timings.

The cell-based minimum cell interval control 32 has the same configuration as the control circuitry 32 shown in and described with reference to FIG. 2.

In operation, the peak rate value 115 and the control scheme selection bit 105 of a channel to be checked are simultaneously supplied to the sliding window control 41 and cell-based minimum cell interval control 32 from the channel information storage 33. The sliding window control scheme is selected for the channel whose control scheme selection bit 105 is "1", whereas the cell-based minimum cell interval control scheme is selected for the channel whose control scheme selection bit 105 is "0". The control scheme selection bit 105 has been set at "1" when the bandwidth of the channel is higher than a threshold set in the band associated with the transmitted cells, and at "0" when it is lower than the threshold. The sliding window control 41 and cell-based minimum cell interval control 32 check whether or not each channel is ready for transmission in the time division mode under such control.

In this case, it is enough for the sliding window control 41 to control the transmission of the cell in the sliding window control method. Accordingly, the width of the window needed for implementing the sliding window control at every 1% interval in the range from 1% to 100% can be arranged by providing the shift register 26 with 100 stages, which is a practical size.

According to the second embodiment, the band is divided into two subbands so that the wider subband is assigned to the sliding window control scheme to be controlled thereby, and the narrower one is assigned to the cell-based minimum cell interval control scheme to be controlled thereby. Thus, the conventional problems can be solved.

Although controlling the wider subband by the cell-based minimum cell interval control scheme has a problem in that the accuracy degrades sharply, the cell rate control can be achieved throughout the entire band with high accuracy by controlling the wider subband by the sliding window control scheme and the narrower subband by the cell-based minimum cell interval control scheme.

Furthermore, since applying the cell-based minimum cell interval control scheme to the narrower subband is equivalent to applying it to channels in which the cell intervals are large, control error due to an increasing number of channels can be reduced thanks to the large intervals between the transmitted cells.

Moreover, since the sliding window control scheme is applied only to the wider subband, the width of the window can be reduced. This enables the hardware scale to be shrunk.

In addition, since only a narrow window width is required, the fluctuations of the cell in the window can be reduced.

Variations of the Present Invention (1) Although the cell rate control schemes are described which are applied to systems employing a fixed length of data, or cell, as a transmission unit in the foregoing embodiments, the present invention can also be applied to various systems using similar control methods. For example, it is applicable to ATM switches, ATM routers, ATM bridges, or tele-communications devices of other terminal equipment.

(2) Although only one threshold value or boundary is set in the control band so that the control schemes are switched depending on whether or not the bandwidth is wider than the threshold value in the foregoing embodiments, a plurality of threshold values or boundaries may be employed so that proper control schemes may be assigned to each subband divided by the threshold values.

According to the present invention, as described above, the entire band is divided into subbands by one or more boundaries, and the transmission control schemes used for data transmission over channels are switched from channel to channel depending on the subband to which the transmission rate proper to each channel belongs. This enables the control accuracy throughout the entire band to be improved as compared with conventional systems which control the entire band using a single control scheme.

The entire disclosure of Japanese patent application No. 159491/1996 filed on Jun. 20, 1996, including the specification, claims, accompanying drawings and abstract of the disclosure is.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A method of controlling data transmission rate comprising the steps of:

controlling data fed to multiplex transmission channels such that data on each of the channels is transmitted at a transmission rate proper to the channel;

dividing an entire band of the transmission channels by at least one threshold to prepare subbands, to each of which a transmission rate proper to a different one of the channels belongs; and selecting, in accordance with each subband, a transmission control scheme used for transmitting data over each of the channels to transmit the data under the transmission control scheme selected.

2. The data transmission rate control method in accordance with claim 1, wherein a number of said at least one threshold is one, and wherein said selecting step comprises the substep of applying as said transmission control scheme used for transmitting data a clock period based scheme to the subband with a wide bandwidth exceeding said threshold, and a cell period based scheme to the subband with a narrow bandwidth not exceeding said threshold.

3. The data transmission rate control method in accordance with claim 1, wherein a number of said at least one threshold is one, and wherein said selecting step comprises the step of applying as said transmission control scheme used for transmitting data a sliding window scheme to the subband with a wide bandwidth exceeding said threshold, and a cell period based scheme to the subband with a narrow bandwidth not exceeding said threshold.

4. A system for controlling data transmission rate by controlling data fed to multiplex transmission channels such that data on each of the channels is transmitted at a transmission rate proper to the channel, wherein the channels have an entire band divided by at least one threshold into subbands, said system comprising:

band identifying means for determining the one of the subbands to which the transmission rate proper to each channel belongs, and for attaching to each of the channels an identifier representative of the subband determined;

a plurality of controllers corresponding to each of said subbands for controlling the data transmission; and means for selecting, in accordance with the identifier, one of said controllers which is suitable for the channel to which the identifier is attached.

5. The system in accordance with claim 4, wherein a number of said at least one threshold is one, and wherein each of said controllers comprises a first control circuit for applying a clock period based scheme to the subband with a wide bandwidth exceeding said threshold, and a second control circuit for applying a cell period based scheme to the subband with a narrow bandwidth not exceeding said threshold.

6. The system in accordance with claim 4, wherein a number of said at least one threshold is one, and wherein each of said controllers comprises a first control circuit for applying a sliding window scheme to the subband with a wide bandwidth exceeding said threshold, and a second control circuit for applying a cell period based scheme to the subband with a narrow bandwidth not exceeding said threshold.

7. The method of controlling data transmission rate according to claim 1, wherein said step of selecting a transmission control scheme comprises the step of selecting a transmission rate control scheme.

8. The system according to claim 4, wherein each of said plurality of controllers comprises means for controlling transmission rate.

* * * * *